United States Patent [19]

Gibson, Sr.

[11] 4,203,191

[45] May 20, 1980

[54] PROCESS AND APPARATUS FOR ASSEMBLING SPIRAL WOUND GASKETS INTO GAUGE RINGS

[75] Inventor: Vernon W. Gibson, Sr., Birmingham, Ala.

[73] Assignee: SEPCO Corporation, Birmingham, Ala.

[21] Appl. No.: 938,655

[22] Filed: Aug. 31, 1978

[51] Int. Cl.² .................... B23P 11/02; B23P 19/02
[52] U.S. Cl. .......................................... 29/451; 29/235;
29/453; 277/204
[58] Field of Search ................... 29/235, 451, 453;
277/204

[56] References Cited

U.S. PATENT DOCUMENTS

| | | | |
|---|---|---|---|
| 2,357,139 | 8/1944 | Seme | 29/453 UX |
| 2,466,263 | 4/1949 | Nardin | 277/204 |
| 2,510,206 | 6/1950 | Barkan et al. | 29/451 UX |
| 2,637,063 | 5/1953 | Becker | 29/451 X |

FOREIGN PATENT DOCUMENTS 734309  4/1943  Fed. Rep. of Germany ............ 29/235

*Primary Examiner*—Charlie T. Moon
*Attorney, Agent, or Firm*—Hugh P. Carter

[57] ABSTRACT

Disclosed is a process and apparatus for assemblying spiral wound gaskets into gauge rings. The process comprises exerting inwardly directed radial forces on the exterior of the spiral wound gasket, causing it to decrease in diameter sufficiently to slip into the gauge ring. The apparatus comprises a holder having a tapered opening and a mandrel which is adapted to engage the periphery of the gasket. As the mandrel with the gasket in place is pushed downwardly through the tapered opening, the mandrel's diameter is decreased and consequently the outer diameter of the spiral gasket is decreased. Means is provided to hold the gauge ring in position immediately adjacent the minor diameter end of the tapered opening in the holder, whereby as the mandrel pushes the gasket out of the minor diameter end it is immediately placed in the hole in the gauge ring where the forces are then released. The gasket is then free to expand outwardly to a tight fit into the gauge ring.

6 Claims, 7 Drawing Figures

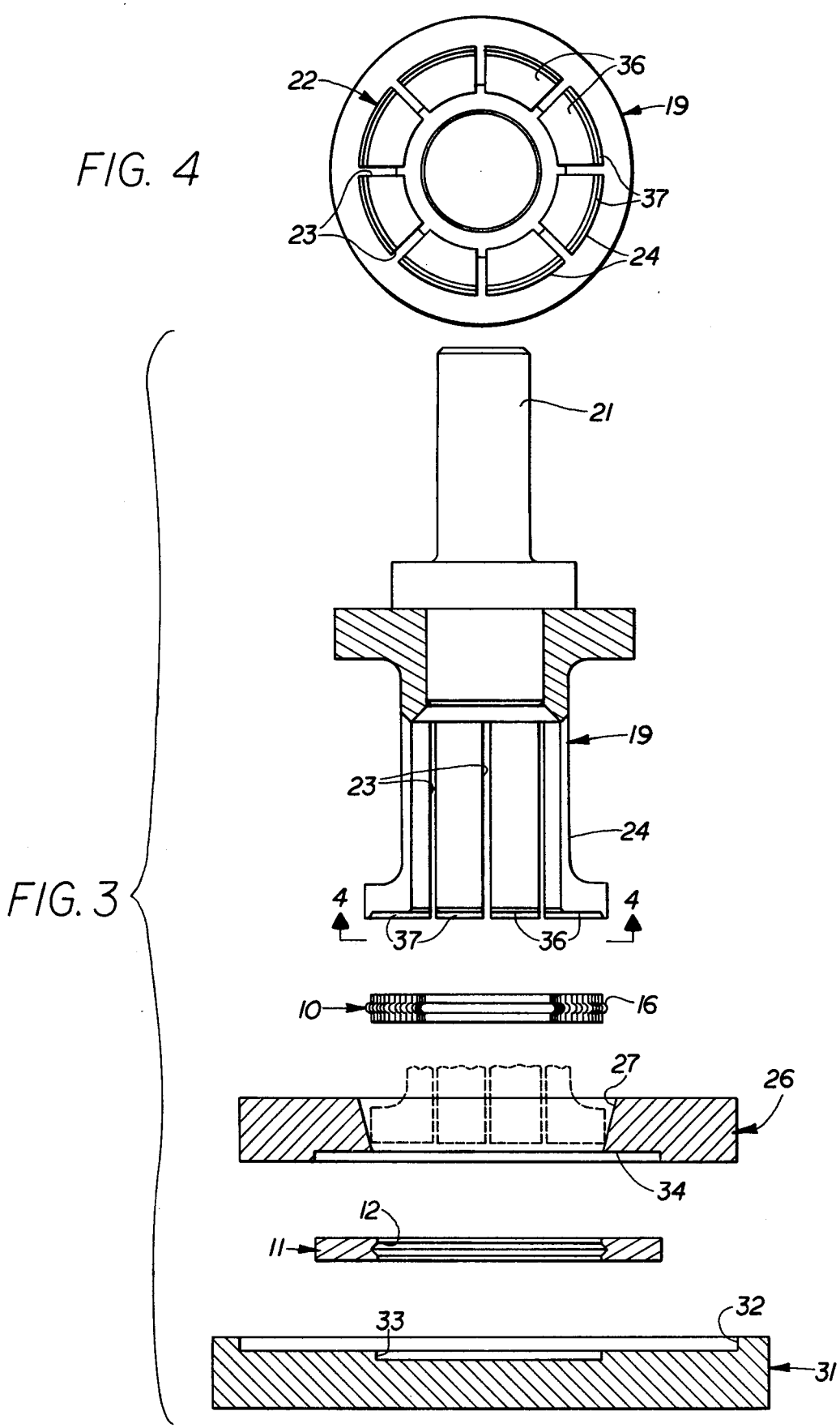

PROCESS AND APPARATUS FOR ASSEMBLING SPIRAL WOUND GASKETS INTO GAUGE RINGS

This invention relates generally to a process and apparatus for assemblying spiral wound gaskets into gauge rings.

As is known in this art, spiral wound gaskets per se consist of alternate layers of spirally wound metal strip and asbestos or other suitable material. Usually, three or four loose wraps of the metal strip are provided on the outer periphery so that the outer diameter of the gasket ring can be varied somewhat by cutting off some of the excess wraps of metal strip so that the gasket can be placed into the gauge ring. The loose wraps act as a spiral spring to retain the gasket ring in the groove of the gauge ring.

Heretofore, to assemble the gasket in a gauge ring the loose wraps were tightly wound about the outer perimeter of the gasket ring by a worker and the gasket then positioned adjacent the groove. The operator may then tap the gasket ring into the groove with the loose wrap springing outwardly against the groove to retain the gasket ring within the outer ring.

Another method of securing gaskets in gauge rings is to deform the metal of the gauge ring, after the gasket has been placed therein.

The foregoing methods of assembly require skill on the part of the worker, are tedious and time consuming and require much hand labor. All in all, all the prior processes for assemblying these devices with which I am familiar leave much to be desired.

In view of the foregoing an object of my invention is to provide an improved process and apparatus by means of which the loose windings forming the outer convolutions of spirally wound gaskets are subjected to radial pressure sufficient to cause these loose windings to wind upon themselves, thus slightly to reduce the overall diameter of the gasket, permitting it to be slipped into a groove or opening in a gauge ring. Upon releasing the pressure the outer windings spring back, thus securing the gasket in the gauge ring without further operations.

More specifically, an object of my invention is to provide a process for assemblying spiral wound gaskets in gauge rings which comprises exerting substantially uniformly about the outer periphery of the gauge ring forces which decrease the outer diameter of the ring and while holding the gasket in this condition, to insert it into the gauge ring, where it may expand and tighten itself therein.

Another object of my invention is to provide apparatus which is fully capable of carrying out the foregoing process and which embodies a mandrel adapted to engage the periphery of the spiral wound gasket, the mandrel being so constructed as to permit its diameter to decrease when subjected to radial forces, together with a holder having a tapered or conical shaped passage therethrough into which the mandrel carrying the gasket may be forced, whereby the outer diameter of the gasket is reduced, permitting it to be placed in reduced diameter condition into a gauge ring.

Apparatus illustrating the constructional features of my invention and which may also be used to carry out my improved process is illustrated in the accompanying drawings forming a part of this application in which:

FIG. 3 is an exploded vertical cross sectional view of my improved apparatus and a spiral wound gasket and gauge ring to be assembled thereby;

FIG. 4 is a view of the mandrel taken generally along line 4—4 of FIG. 3;

Figures 1, 2:
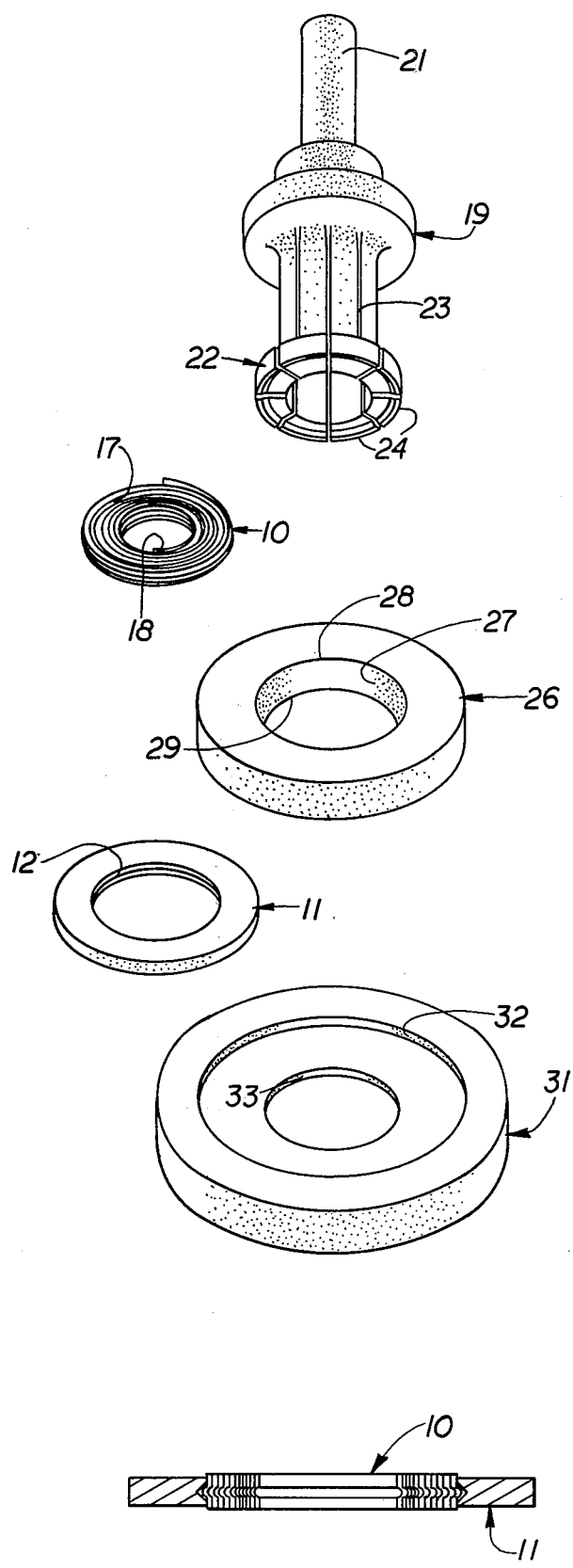
FIG. 1 is a cross sectional view of an assembled spiral wound gasket and gauge ring.
FIG. 2 is an exploded isometric view of my improved apparatus and one of the spiral wound gaskets and gauge rings to be assembled thereby.

Referring now to the drawings for a better understanding of my invention it will be understood that the object of the same is to assemble a spiral wound gasket 10 into a gauge ring 11.

As is known in the art, the gauge ring is provided with an internal generally V-shaped groove 12. In like manner, the gasket 10 is made up of a spirally wound, alternate layer of asbestos or the like 13 and a thin metal strip 14. The strip 14 is provided with a bead section 16 so that when spirally wound the bead section is adapted to engage into the groove 12, to assemble the two parts.

Figure 5:
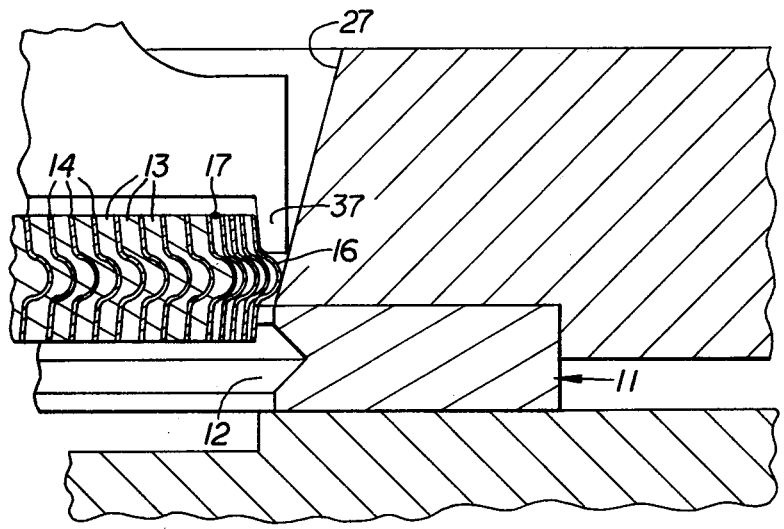
FIG. 5 is an enlarged detail fragmental view partly broken away and in section showing one side of the spiral wound gasket being pushed downwardly for insertion into the gauge ring.

It will be understood that in fabricating the gasket 10 certain ones of the spirals of the metal adjacent the outer periphery may be spot welded or otherwise secured together as indicated in FIGS. 2 and 5 by the numeral 17. In other words, at the inner end of the spiral the asbestos is omitted for at least a portion of one convolution and the layers are spot welded as at 18. Similarly, about at the point 17 in the winding the asbestos is omitted so that in reality there is no asbestos in the immediate several outer convolutions of the spiral. Therefore, the outer convolutions of these gaskets in effect constitute a spiral wound spring comprised of the metal strip 14. Since these are loose, that is, not tightly wound one upon the other, I have found that by exerting on the exterior of the ring radial forces as hereinafter described, the effective diameter of the gasket can be decreased sufficiently to permit it to be placed into the gauge ring 11.

My improved apparatus comprises essentially three parts. First, there is a mandrel indicated generally by the numeral 19 which may have a stem 21 which can be engaged in the jaw of a vertically reciprocating tool. Next, the mandrel 19 is provided with a gasket engaging section 22. The section 22 is longitudinally split as indicated at 23 to provide a number of independent sections 24. As the description proceeds it will be apparent that the gasket engaging section 22 of the mandrel is capable of having its overall diameter decreased, thus to put radial forces upon the exterior of the gasket.

The next component of my invention is what I call a holder indicated generally by the numeral 26. This holder may be a ring of steel. Passing through the holder is a conical or tapered opening 27. The major diameter of the opening is at the top of the member 26 as indicated by the numeral 28 and the minor diameter thereof is indicated by the numeral 29.

The third component is the base or gauge ring retaining section indicated by the numeral 31. The base is provided with circular opening 32 snugly to receive the holder 26 when the parts come together. Also, the base 31 is provided with an opening 33 of a size to pass the lower section of the spiral wound gasket as it is being placed into the gauge ring as presently will appear. Also, and as is shown is FIGS. 3 and 6 the holder 26 is provided with an undercut section 34 to engage snugly about the outer circumference of the gauge ring while the gasket ring is being assembled into the gauge ring.

Referring again to the mandrel 19 it will be seen that each of the sections 24, at their gasket receiving surfaces are undercut as at 36 leaving segmental or arcuate shaped, depending flanges 37 around the outer periphery of each of the sections 24.

With the foregoing description of the apparatus in mind it is now possible more fully to explain my improved apparatus and process and to appreciate the advantages thereof.

Figure 6:
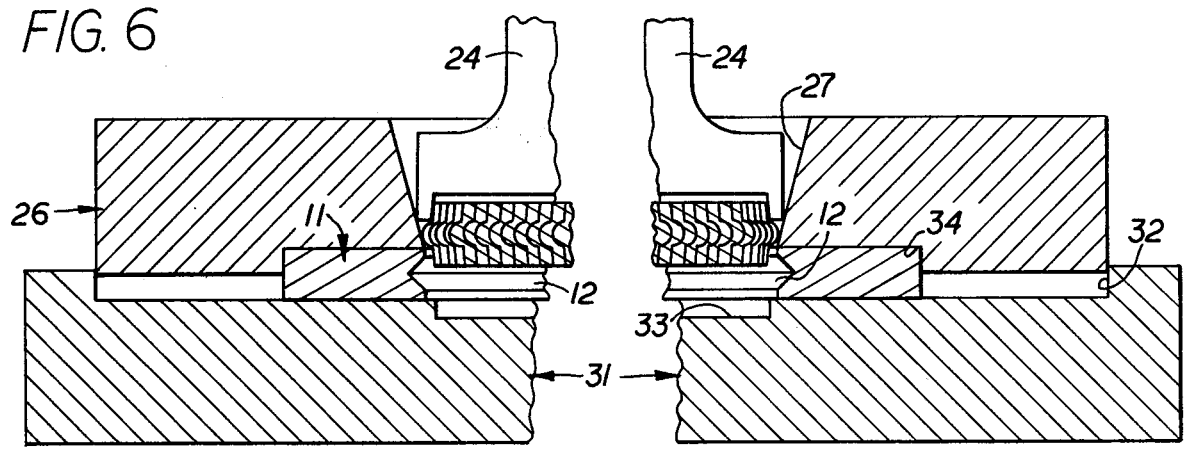
FIG. 6 is a detail fragmental sectional view, partly broken away and in section, and illustrating the spiral wound gasket about to be pushed from the holder into the gauge ring; and, FIG. 7 is a wholly diagrammatic view illustrating the forces imposed on the outer periphery of the gasket by the mandrel and the holder.

First, it will be understood that the mandrel may be mounted in a vertically reciprocable power tool of some sort. With the base 31 accurately positioned relative to the vertical center line of the mandrel, a gauge ring is now inserted into the opening 34 of the holder 26 and the holder is then interfitted with the opening 32 in the base 31. This results in the disposition of these parts being generally as shown in FIGS. 5 and 6. Next, one of the spiral wound gaskets is simply laid into the opening 27, in unwound or expanded condition, meaning that the gasket will slide partially down into the opening 27, but not go all the way, by simply placing it therein. The mandrel is now brought down onto the gasket whereupon the separate fingers 24 carrying the flanges 37 engage the gasket as illustrated in FIGS. 5 and 6. The parts are dimensioned so that as the mandrel carrying the gasket moves down through the passage 27, from the larger diameter section to the minor diameter section thereof, the side walls of that passage engage the outer peripheries of the outer portions 37 of the fingers 24. Further downward motion causes the placing of inward, radial forces on the upper half of the gasket, above the bead 16 inasmuch as the fingers 24 are moved radially inwardly due to the decreasing diameter of the passage 27.

Figure 7:
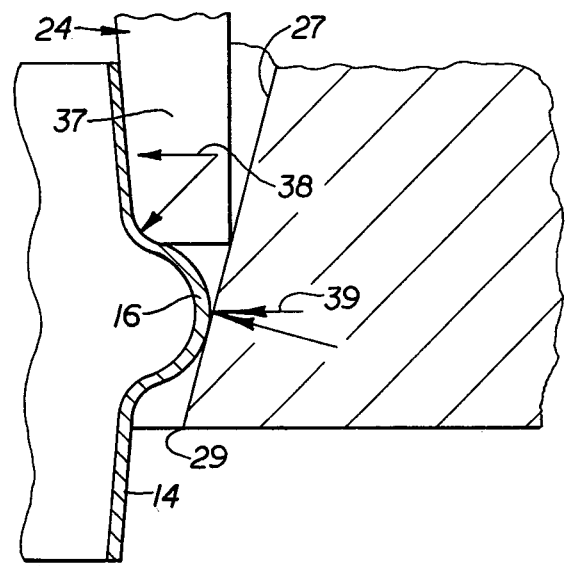

The parts also are so relatively dimensioned that during the process of forcing the gasket downwardly the bead 16 of the outermost layer of the gasket engages the opening 27. Thus, and as is illustrated in FIG. 7, components of radial forces are applied to the gasket at two places. First, and as illustrated by the arrow 38, FIG. 7, the fingers 24 are forced inwardly, exerting radial forces substantially simultaneously about the upper half of the gasket, thus reducing its diameter. Simultaneously, as shown by arrow 39, FIG. 7, the bead of the outer section engages the walls of the tapered opening 27, thereby exerting additional and further radial or winding forces upon the outer flight of the gasket. It will thus be seen that by the time the top of the bead of the gasket reaches the minor diameter end 29 of the tapered opening, a slight continued movement past that point causes the bead of the gasket to snap into the groove 12 of the gauge ring. The mandrel is now moved upwardly, whereby the gasket unwinds or springs into position, thus self-tightening itself within the gauge ring.

It will be noted that the radial forces applied by the mandrel member are applied to the gasket at a point above its axial center, namely, at a point above the central bead 16. Therefore, as soon as the bead 16 commences to enter groove 12 of the gauge ring the gasket and ring are effectively locked so that withdrawal of the mandrel does not pull the gasket back out, but on the other hand the gasket remains in the groove, completing the assembly.

In view of the foregoing it will be seen that I have devised an improved process and apparatus for assembling spiral wound gaskets into gauge rings. My invention represents a considerable improvement upon other methods of assembly known to me, is fast, dependable and trouble-free in operation. For instance, unlike some prior art methods I assemble and hold the gasket and gauge ring without the necessity of deforming or altering the gauge ring in any manner. Furthermore, unskilled labor may be used in carrying out my improved process and in operating my improved apparatus.

In actual practice my invention has proven to be trouble-free and practical and as of the date of this application is in commercial use in assemblying these gaskets into gauge rings.

While I have shown my invention in but one form, it will be obvious to those skilled in the art that it is not so limited, but is susceptible of various changes and modifications without departing from the spirit thereof.

I claim:

1. The process of assemblying a spiral wound gasket of the king embodying a metal strip having a longitudinal channel forming a circumferential, outwardly projecting bead, into the opening of a gauge ring comprising:
   (a) simultaneously exerting forces about the outer periphery of the bead and on an outer area of the gasket axially displaced from the bead which reduce the external diameter of the gasket sufficiently for the same to be placed into the opening in the gauge ring, and
   (b) removing the forces acting on the bead of said gasket prior to removing the forces on the area displaced from the bead, whereby the bead portion of the gasket may be placed at least partly in the gauge ring opening while the gasket is still held in reduced diameter condition.

2. The process of claim 1 in which the said area in which the said diameter reducing forces are exerted is located on the axial side of the gasket last to enter the opening of the gauge ring during assembly.

3. In apparatus for assemblying a spiral wound gasket into the opening of a gauge ring comprising,
   (a) a holder having a conical shaped passage therethrough, the major and minor diameters of which passage are respectively larger than the gasket in released condition and smaller than the opening in the gauge ring,
   (b) a mandrel disposed to engage the gasket about a portion of the axial extent of its exterior circumference and push it through the holder and out of the minor diameter end of said passage, and
   (c) means adjacent the minor diameter end of the passage to hold the gauge ring in position to receive the gasket as it emerges from the holder.

4. Apparatus as defined in claim 3 in which the mandrel has a sleeve-like gasket engaging end, said sleeve-like end being axially divided into a plurality of sections, thereby permitting the gasket engaging end of the mandrel to decrease in diameter as it moves through the holder with the gasket in place in the mandrel.

5. In apparatus for assemblying a relaxed spiral wound gasket into the opening of a gauge ring, (a) a holder having a conical shaped passage therethrough, the major diameter of the passage being at least as large as the diameter of the relaxed gasket and the minor diameter being substantially the diameter of the opening in the gauge ring, (b) a mandrel having a gasket contacting section disposed to contact the relaxed gasket about an axial extent of its periphery, (c) the gasket contacting section of the mandrel being axially divided into a plurality of segments, permitting reduction in the diameter of the mandrel, (d) the relative dimensions of the gasket contacting mandrel sections and the passage vis-a-vis the reduced diameter of the gasket being such that as the mandrel and gasket move toward the minor diameter end of said passage the convolutions of said gasket are wound upon themselves, thereby reducing the diameter of the gasket, and (e) means to hold the gauge ring in gasket receiving position adjacent the minor diameter end of the passage.

6. Apparatus as defined in claim 5 in which the gasket contacting sections of the mandrel engage the outer periphery of the gasket about only a portion of the axial extent of the gasket, whereby the gasket is held in reduced diameter condition while another axial extent thereof is being placed in the gauge ring opening.

* * * * *